(12) United States Patent
Simmons et al.

(10) Patent No.: US 7,583,104 B2
(45) Date of Patent: Sep. 1, 2009

(54) MAINTAINING INPUT AND/OR OUTPUT CONFIGURATION AND DATA STATE DURING AND WHEN COMING OUT OF A LOW POWER MODE

(75) Inventors: Michael Simmons, Chandler, AZ (US); Igor Wojewoda, Tempe, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 11/609,610

(22) Filed: Dec. 12, 2006

(65) Prior Publication Data

US 2008/0136450 A1 Jun. 12, 2008

(51) Int. Cl.
*H03K 19/094* (2006.01)
(52) U.S. Cl. .......................................... 326/82; 326/86
(58) Field of Classification Search ............. 326/82–87; 327/108–109
See application file for complete search history.

(56) References Cited

U.S. PATENT DOCUMENTS

| | | | | |
|---|---|---|---|---|
| 6,654,898 | B1 * | 11/2003 | Bailey et al. | 713/500 |
| 7,058,827 | B2 * | 6/2006 | Rose et al. | 713/320 |
| 2003/0133330 | A1 | 7/2003 | Pekny | |
| 2004/0252573 | A1 | 12/2004 | Hanson et al. | |
| 2005/0104643 | A1 | 5/2005 | Tran et al. | |

OTHER PUBLICATIONS

International Search Report and Written Opinion for PCT/US2007/086963 mailed Jun. 24, 2008.

* cited by examiner

*Primary Examiner*—Rexford N Barnie
*Assistant Examiner*—Thienvu V Tran
(74) *Attorney, Agent, or Firm*—King & Spalding LLP

(57) ABSTRACT

A semiconductor integrated circuit device upon exiting from a low power mode, wakes up and re-initializes logic circuits so as to restore previous logic states of internal registers without disturbing input-output (I/O) configuration control and data states present at the time the low power mode was entered. Thus not distributing the operation of other devices connected to the semiconductor integrated circuit device previously in the low power mode. Once all internal logic and registers of the semiconductor integrated circuit device have been re-initialized, a "low power state wake-up and restore" signal may issue. This signal indicates that the I/O configuration control and data states stored in the I/O keeper cell at the time the integrated circuit device entered into the low power mode have been reinstated and control may be returned to the logic circuits and/or internal registers of the semiconductor integrated circuit device.

27 Claims, 5 Drawing Sheets

MAINTAINING INPUT AND/OR OUTPUT CONFIGURATION AND DATA STATE DURING AND WHEN COMING OUT OF A LOW POWER MODE

TECHNICAL FIELD

The present disclosure relates to a semiconductor integrated circuit device entering into, during and coming out of a low power mode, and more particularly, to maintaining the input and/or output configuration and data state(s) during and when the semiconductor integrated circuit device comes out of the low power mode.

BACKGROUND

Integrated circuit devices are being fabricated with decreasing transistor geometry sizes that result in increased leakage currents during operation thereof. One solution to reducing leakage currents when operation of the integrated circuit device is not required is to shut down and/or remove power from some or most of the transistor logic circuits of the integrated circuit device. This puts the transistor logic circuits of the integrated circuit device into a "low power mode" that substantially reduces the power requirements of the integrated circuit device during extended standby conditions.

With current architecture implementations of a low power mode in an integrated circuit device, exiting from the low power mode is similar to performing a power-on reset (POR) of the integrated circuit device. While the internal logic states of the integrated circuit device may be woken-up and restored by software and/or firmware, it is important to keep the interaction between the integrated circuit device and other devices in an electronic system that are connected to the integrated circuit device static so as to avoid disturbing the system, and thereby causing unintended actions in and/or by the electronic system.

Through the use of standard input-output (I/O) "keeper" cells, the I/O control and data states of the outputs of the integrated circuit device (during the low power mode) may be retained so as not to upset operation of the other devices in the electronic system. However, upon waking from a low power mode, the I/O control and data states may be reset into a default reset state, e.g., logic 0, logic 1, or unknown, thereby possibly disturbing operation of the other devices in the electronic system. Thus, unintended actions may result to the other devices connected to the integrated circuit device when the integrated circuit device comes out of the low power mode.

SUMMARY

Therefore what is desired is a way upon exiting a low power mode, to re-initialize logic circuits and/or wake-up and restore logic states of any internal registers (if necessary), and re-establish the desired I/O configuration control and data states without distributing the operation of other devices in an electronic system. According to teachings of this disclosure, a "low power mode wake-up and restore" signal, e.g., a bit that may be set or reset by software, may be used to indicate to the I/O keeper cells to stop overriding the I/O configuration control and data states previously stored when the integrated circuit device entered into the low power mode.

According to a specific example embodiment of this disclosure, an integrated circuit device having a low power mode and a maintained input-output (I/O) configuration and data states may comprises: a plurality of logic circuits; and an input-output (I/O) node coupled to the plurality of logic circuits, the I/O node comprises an I/O keeper cell coupled to a driver and a receiver; wherein when the I/O keeper cell receives an enter low power mode signal the I/O keeper cell will maintain the driver data state and I/O configuration thereof; and wherein when the I/O keeper cell receives a wake-up and restore from low power mode signal the I/O keeper cell returns control of the driver data state and I/O configuration to the plurality of logic circuits.

According to another specific example embodiment of this disclosure, an integrated circuit device having a low power mode and a maintained output configuration and data state may comprise: a plurality of logic circuits; and an output node coupled to the plurality of logic circuits, the output node comprises an output keeper cell coupled to a driver; wherein when the output keeper cell receives an enter low power mode signal the output keeper cell will maintain the driver data state and output configuration thereof; and wherein when the output keeper cell receives a wake-up and restore from low power mode signal the output keeper cell returns control of the driver data state and output configuration to the plurality of logic circuits.

According to yet another specific example embodiment of this disclosure, an integrated circuit device having a low power mode and a maintained input configuration and data state may comprise: a plurality of logic circuits; and an input node coupled to the plurality of logic circuits, the input node comprises an input keeper cell coupled to a receiver; wherein when the input keeper cell receives an enter low power mode signal the input keeper cell will maintain the receiver data state and input configuration thereof; and wherein when the input keeper cell receives a wake-up and restore from low power mode signal the input keeper cell returns control of the receiver data state and input configuration to the plurality of logic circuits.

According to still another specific example embodiment of this disclosure, a method of maintaining input-output (I/O) configuration and data states during and when coming out of a low power mode in an integrated circuit device, said method may comprise the steps of: entering into a low power mode for logic circuits of the integrated circuit device; retaining input-output (I/O) configuration and data states in a keeper cell; controlling the I/O configuration and the data states from the keeper cell; restoring the logic circuits from the low power mode; exiting the low power mode; and returning control of the I/O configuration and data states to the logic circuits.

According to another specific example embodiment of this disclosure, a method of maintaining input-output (I/O) configuration and data states during and when coming out of a low power mode in an integrated circuit device may comprise the steps of: detecting assertion of an enter low power mode command; entering into a low power mode for logic circuits of the integrated circuit device when the enter low power mode command is detected; retaining input-output (I/O) configuration and data states in a keeper cell; controlling the I/O configuration and the data states from the keeper cell; restoring the logic circuits from the low power mode; detecting assertion of a wake-up and restore from low power mode command; exiting the low power mode when the wake-up and restore from low power mode command is detected; and returning control of the I/O configuration and data states to the logic circuits.

BRIEF DESCRIPTION OF THE DRAWINGS

A more complete understanding of the present disclosure thereof may be acquired by referring to the following description taken in conjunction with the accompanying drawings wherein.

Figure 1:
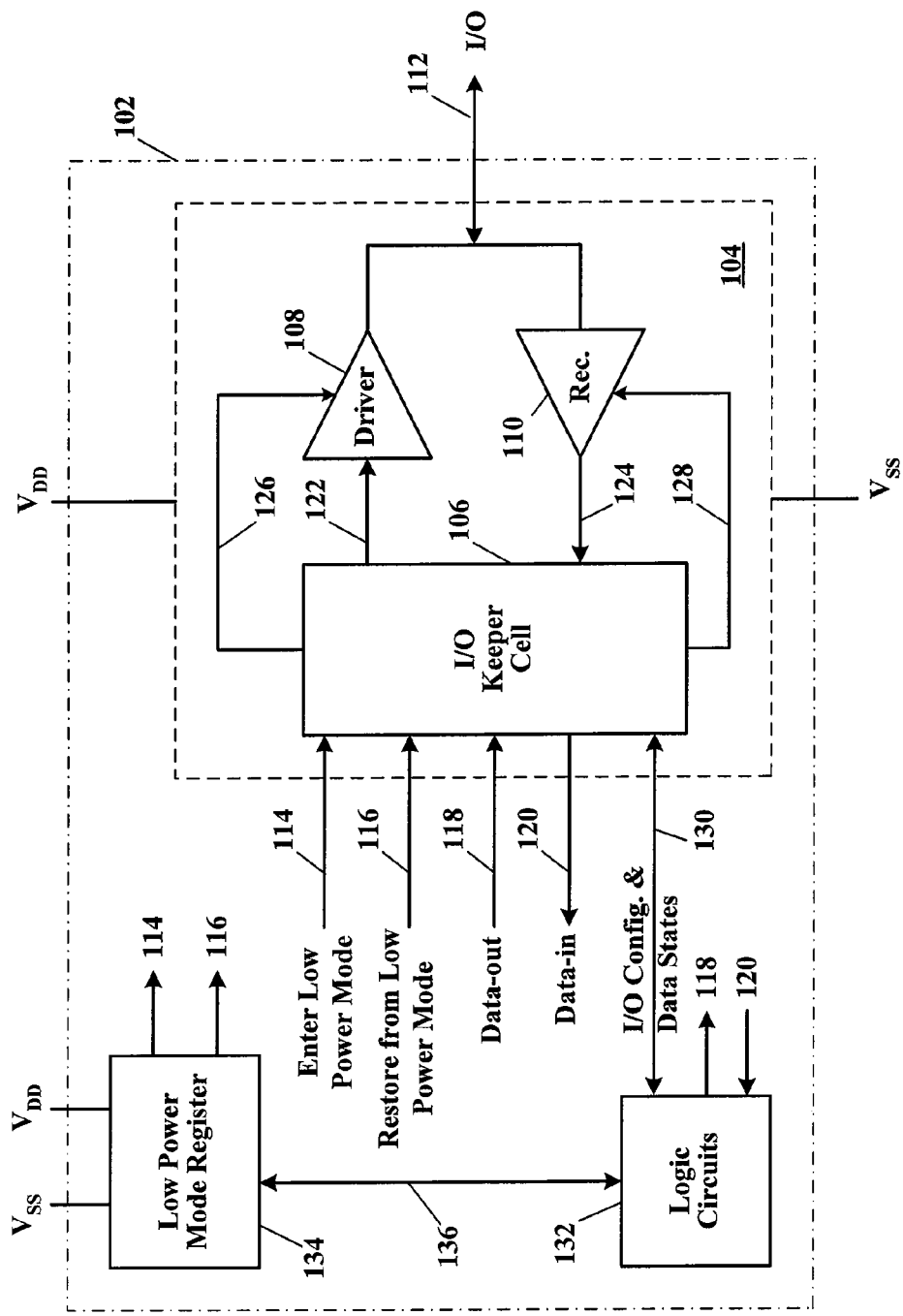
FIG. 1 illustrates a schematic block diagram of an input-output (I/O) node having an I/O keeper cell in an integrated circuit device, according to a specific example embodiment of this disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

Referring now to the drawings, the details of specific example embodiments are schematically illustrated. Like elements in the drawings will be represented by like numbers, and similar elements will be represented by like numbers with a different lower case letter suffix.

Referring to FIG. 1, depicted is a schematic block diagram of an input-output (I/O) node having an I/O keeper cell in an integrated circuit device, according to a specific example embodiment of this disclosure. An integrated circuit device 102, e.g., microprocessor, microcontroller, digital signal processor (DSP), programmable logic array (PLA), application specific integrated circuit (ASIC), etc., may comprise a configurable input-output (I/O) node 104, a low power mode register 134 and a plurality of logic circuits 132, some of which may be coupled to the configurable I/O node 104 and/or the low power mode register 134.

The configurable I/O node 104 may comprise a driver 108, a receiver 110, and an I/O keeper cell 106. An I/O configuration and data states signal line 130 may be used for configuring the configurable I/O node 104 as an input and/or an output node by asserting a desired configuration through the I/O keeper cell 106 and configuration control signal lines 128 and 126. The I/O configuration and data states signal line 130 may also be used to configure the driver 108 as open collector, active pull-up, active pull-down, or tri-state having active logic high and active logic low with a high impedance third state. Selection of the pull-up or pull-down resistance value, slew rate, drive capabilities, etc., for the driver 108 may also be configured. These configurations may be performed by firmware in the integrated circuit device 102 and/or external program software having access to and configuration permission for the integrated circuit device 102.

When the configurable I/O node 104 is configured as an output node, a data-out signal line 118 may be used to convey data from the plurality of logic circuits 132 of the integrated circuit device 102, through the I/O keeper cell 106, over the data signal line 122 to the driver 108. The output of the driver 108 is coupled to the external I/O connection 112 of the integrated circuit package (not shown) containing the integrated circuit device 102.

When the configurable I/O node 104 is configured as an input node, a data-in signal line 120 may be used to convey data to the plurality of circuits 132 of the integrated circuit device 102, from the I/O keeper cell 106, over the data signal line 124 from the receiver 110. The input of the receiver 110 is coupled to the external I/O connection 112 of the integrated circuit package (not shown) containing the integrated circuit device 102.

When the configurable I/O node 104 is configured as an input-output node, the data-in signal line 120 and the data-out signal line 118 function as described hereinabove. The driver 108 may remain active at all times wherein the receiver 110 will monitor the output state of the driver 108, and/or the driver 108 may be placed in an inactive state, e.g., unasserted open collector or tri-state in high impedance, whenever an external data signal is expected to be received on the external I/O connection 112.

When the integrated circuit device 102 goes into a low power mode, a signal on the enter low power mode signal line 114 will tell the I/O keeper cell 106 to latch-in (store, retain, etc.) the I/O configuration of the configurable I/O node 104 and the present data-in and/or data-out logic level on the data-in signal line 120 or data-out signal line 118, respectively. This latched-in (stored, retained, etc.) I/O configuration and data logic level(s) may be retained during and after the integrated circuit device 102 goes into and comes out of the low power mode. The configurable I/O node 104 and low power mode register 134 remain operational with sustained power from a maintained power supply, $V_{DD}/V_{SS}$.

As the integrated circuit device 102 comes out of the low power mode, the plurality of logic circuits 132 will perform a systematic, well-defined sequence for waking up and for establishing proper logic levels on all internal signal paths of the integrated circuit device 102. Only after all internal logic levels have been properly re-established may a wake-up and restore signal be sent on the wake-up and restore from low power mode signal line 116, wherein the I/O keeper cell 106 will cease to latch-in (store, retain, etc.) the last I/O configuration and data logic level(s), and will become transparent again between circuits in the configurable I/O node 104 (e.g., driver 108 and/or receiver 110), and the data-out signal line 118 and/or data-in signal line 120 and the I/O configuration and data states signal line 130. A bit from the low power mode register 134 may be used as the wake-up and restore signal sent over the wake-up and restore from low power mode signal line 116.

It is contemplated and within the scope of this disclosure that the wake-up and restore from low power mode signal line 116 may be activated by software and/or firmware after the I/O configuration and data logic level(s), retained by the I/O keeper cell 106, have been read by the software and/or firmware. Thus, software control of the wake-up and restore from low power mode signal line 116 may insure that the same I/O configuration and logic level(s) are retained, thereby not disturbing any external devices in the electronic system (not shown). The enter low power mode signal line 114 may also be activated by software and/or firmware before the integrated circuit device 102 goes into a low power mode.

It is also contemplated and within the scope of this disclosure that signal lines 114 and 116 may be combined into one signal line with a first logic level thereon indicating "enter low power mode" and a transition to a second logic level thereon indicating "wake-up and restore from low power mode." Since the low power mode register 134 may be powered along with the configurable I/O node 104 from $V_{DD}/V_{SS}$, the single signal line "enter low power mode/wake-up and restore from low power mode" may be maintained in either the first logic level or second logic level when going into the low power mode or coming out of the low power mode, respectively, e.g., the transition from first logic level to second logic level, or visa-versa, would cause the change in operation of the configurable I/O node 104 from "enter low power mode" to "wake-up and restore from low power mode."

Figure 2:
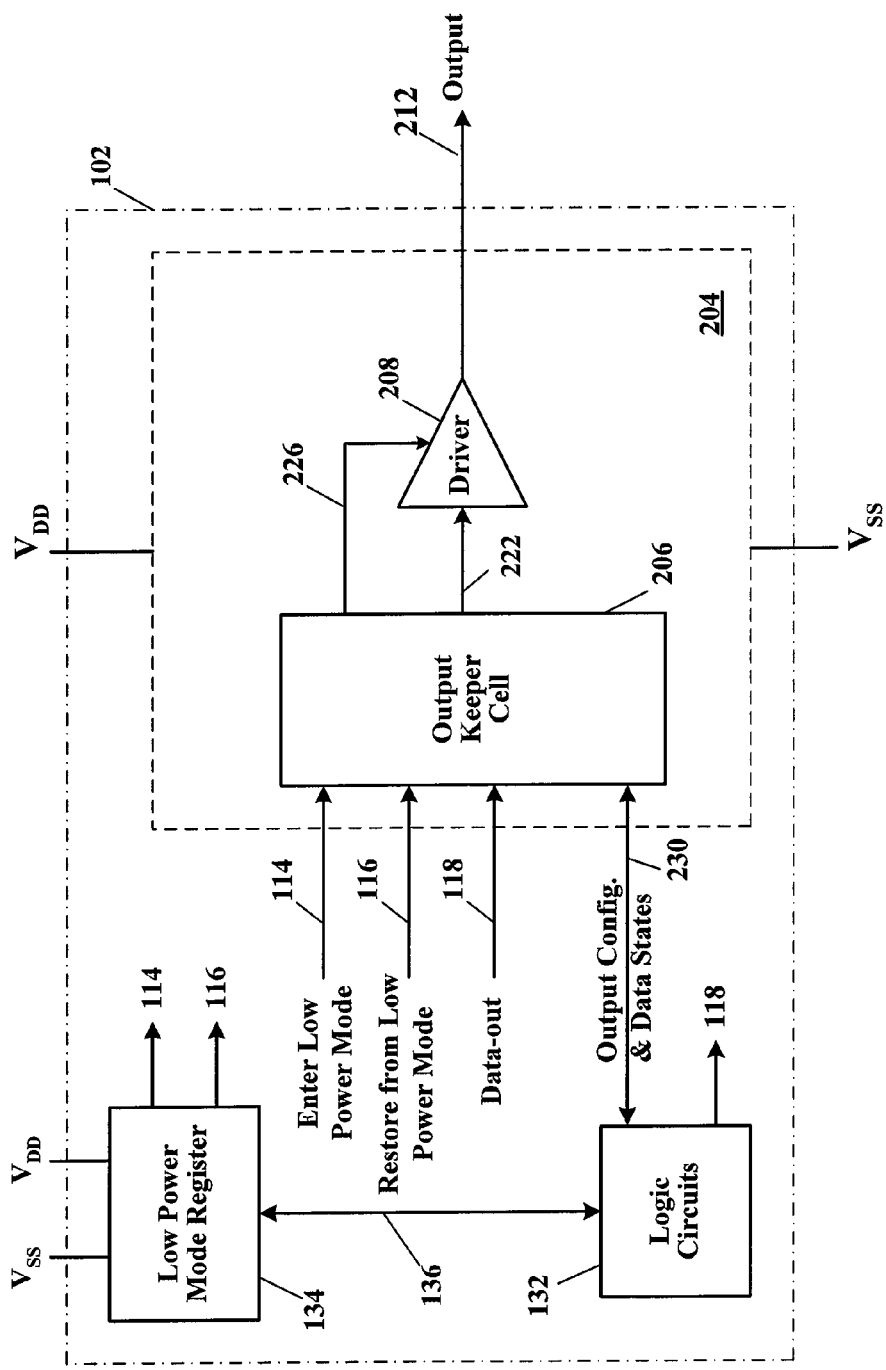
FIG. 2 illustrates a schematic block diagram of an output node having an output keeper cell in an integrated circuit device, according to another specific example embodiment of this disclosure.

Referring to FIG. 2, depicted is a schematic block diagram of an output node having an output keeper cell in an integrated circuit device, according to another specific example embodiment of this disclosure. An integrated circuit device 102, e.g., microprocessor, microcontroller, digital signal processor (DSP), programmable logic array (PLA), application specific integrated circuit (ASIC), etc., may comprise an output node 204, a low power mode register 134 and a plurality of logic circuits 132, some of which may be coupled to the output node 204 and/or the low power mode register 134.

The output node 204 may comprise a driver 208 and an output keeper cell 206. An output configuration and data states signal line 230 may be used for configuring the output node 204 by asserting a desired configuration through the output keeper cell 206 and configuration control signal line 226. The output configuration and data states signal line 230 may also be used to configure the driver 208 as open collector, active pull-up, active pull-down, or tri-state having active logic high and active logic low with a high impedance third state. Selection of the pull-up or pull-down resistance value, slew rate, drive capabilities, etc., for the driver 208 may also be configured. These configurations may be performed by firmware in the integrated circuit device 102 and/or external program software having access to and configuration permission for the integrated circuit device 102.

A data-out signal line 118 may be used to convey data from the internal logic circuits 132 of the integrated circuit device 102, through the output keeper cell 206, over the signal line 222 and to the driver 208. The output of the driver 208 is coupled to the external output connection 212 of the integrated circuit package (not shown) containing the integrated circuit device 102.

When the integrated circuit device 102 goes into a low power mode, a signal on the enter low power mode signal line 114 will tell the output keeper cell 206 to latch-in (store, retain, etc.) the present data-out logic level on the data-out signal line 118. This latched-in (stored, retained, etc.) data logic level may be retained during and after the integrated circuit device 102 goes into and comes out of the low power mode. The output node 204 and low power mode register 134 remain operational with sustained power from a maintained power supply, $V_{DD}/V_{SS}$.

As the integrated circuit device 102 comes out of the low power mode, the plurality of logic circuits 132 will perform a systematic, well-defined sequence for waking up and for establishing proper logic levels on all internal signal paths of the integrated circuit device 102. Only after all internal logic levels have been properly re-established will a wake-up and restore signal be sent on the wake-up and restore from low power mode signal line 116, wherein the output keeper cell 206 will cease to latch-in (store, retain, etc.) the last output configuration and/or data logic level, and will become transparent again between circuits in the output node 204 (e.g., driver 208), and the data-out signal line 118 and the output configuration and data states signal line 230. A bit from the low power mode register 134 may be used as the wake-up and restore signal sent over the wake-up and restore from low power mode signal line 116.

It is contemplated and within the scope of this disclosure that the wake-up and restore from low power mode signal line 116 may be activated by software and/or firmware after the output configuration and data logic level, retained by the output keeper cell 206, have been read by the software and/or firmware. Thus, software control of the wake-up and restore from low power mode signal line 116 may insure that the same output configuration and output logic level are retained, thereby not disturbing any external devices in the electronic system (not shown). The enter low power mode signal line 114 may also be activated by software and/or firmware before the integrated circuit device 102 goes into a low power mode.

It is also contemplated and within the scope of this disclosure that signal lines 114 and 116 may be combined into one signal line with a first logic level thereon indicating "enter low power mode" and a transition to a second logic level thereon indicating "wake-up and restore from low power mode." Since the low power mode register 134 may be powered along with the output node 204 from $V_{DD}/V_{SS}$, the single signal line "enter low power mode/wake-up and restore from low power mode" may be maintained in either the first logic level or second logic level when going into the low power mode or coming out of the low power mode, respectively, e.g., the transition from first logic level to second logic level, or visa-versa, would cause the change in operation of the output node 204 from "enter low power mode" to "wake-up and restore from low power mode."

Figure 3:
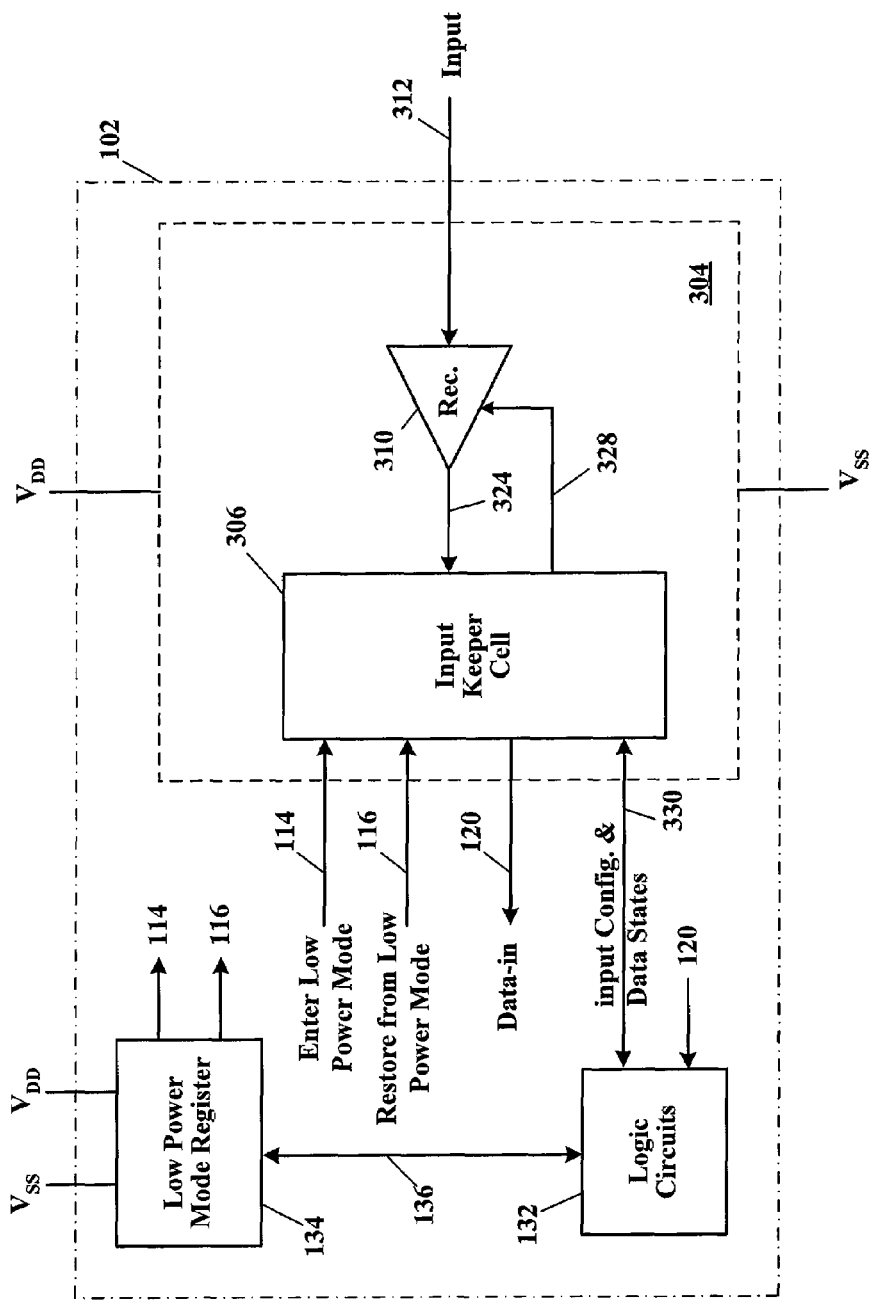
FIG. 3 illustrates a schematic block diagram of an input node having an input keeper cell in an integrated circuit device, according to yet another specific example embodiment of this disclosure.

Referring to FIG. 3, depicted is a schematic block diagram of an input node having an input keeper cell in an integrated circuit device, according to yet another specific example embodiment of this disclosure. An integrated circuit device 102, e.g., microprocessor, microcontroller, digital signal processor (DSP), programmable logic array (PLA), application specific integrated circuit (ASIC), etc., may comprise an input node 304, a low power mode register 134 and a plurality of logic circuits 132, some of which may be coupled to the input node 304 and/or the low power mode register 134.

The input node 304 may comprise a receiver 310 and an input keeper cell 306. An input configuration and data states signal line 330 may be used for configuring the input node 304 by asserting a desired configuration through the input keeper cell 306 and configuration control signal line 328. The input configuration and data states signal line 330 may also be used to configure the receiver 310 for input impedance, speed, slew rate, power consumption, etc. These configurations may be performed by firmware in the integrated circuit device 102 and/or external program software having access to and configuration permission for the integrated circuit device 102.

A data-in signal line 120 may be used to convey data to the plurality of logic circuits 132 of the integrated circuit device 102, from the input keeper cell 306, over the signal line 324 from the receiver 310. The input of the receiver 310 is coupled to the external input connection 312 of the integrated circuit package (not shown) containing the integrated circuit device 102.

When the integrated circuit device 102 goes into a low power mode, a signal on the enter low power state signal line 114 will tell the input keeper cell 306 to latch-in (store, retain, etc.) the present data-in logic level on the data-in signal line 120. This latched-in (stored, retained, etc.) data logic level may be retained during and after the integrated circuit device 102 goes into and comes out of the low power mode. The input node 304 and low power mode register 134 remain operational with sustained power from a maintained power supply, $V_{DD}/V_{SS}$.

As the integrated circuit device 102 comes out of the low power mode, the plurality of logic circuits 132 will perform a systematic, well-defined sequence for waking up and for establishing proper logic levels on all internal signal paths of the integrated circuit device 102. Only after all internal logic levels have been properly re-established may a wake-up and restore signal be sent on the wake-up and restore from low power mode signal line 116, wherein the input keeper cell 306 will cease to latch-in (stored, retained, etc.) the last input configuration and/or data logic level, and will become transparent again between circuits in the input node 304 (e.g., receiver 310), and the data-in signal line 120 and the input configuration and data states signal line 330. A bit from the low power mode register 134 may be used as the wake-up and restore signal sent over the wake-up and restore from low power mode signal line 116.

It is contemplated and within the scope of this disclosure that the wake-up and restore from low power mode signal line 116 may be activated by software and/or firmware after the input configuration and data logic level, retained by the input keeper cell 306, have been read by the software and/or firmware. Thus, software control of the wake-up and restore from the low power mode signal line 116 may insure that the same input configuration and input logic level are retained, thereby not disturbing any external devices in the electronic system (not shown). The enter low power mode signal line 114 may also be activated by software and/or firmware before the integrated circuit device 102 goes into a low power mode.

It is also contemplated and within the scope of this disclosure that signal lines 114 and 116 may be combined into one signal line with a first logic level thereon indicating "enter low power mode" and a transition to a second logic level thereon indicating "wake-up and restore from low power mode." Since the low power mode register 134 may be powered along with the input node 304 from $V_{DD}/V_{SS}$, the single signal line "enter low power mode/wake-up and restore from low power mode" may be maintained in either the first logic level or second logic level when going into the low power mode or coming out of the low power mode, respectively, e.g., the transition from first logic level to second logic level, or visa-versa, would cause the change in operation of the input node 304 from "enter low power mode" to "wake-up and restore from low power mode".

Figure 4:
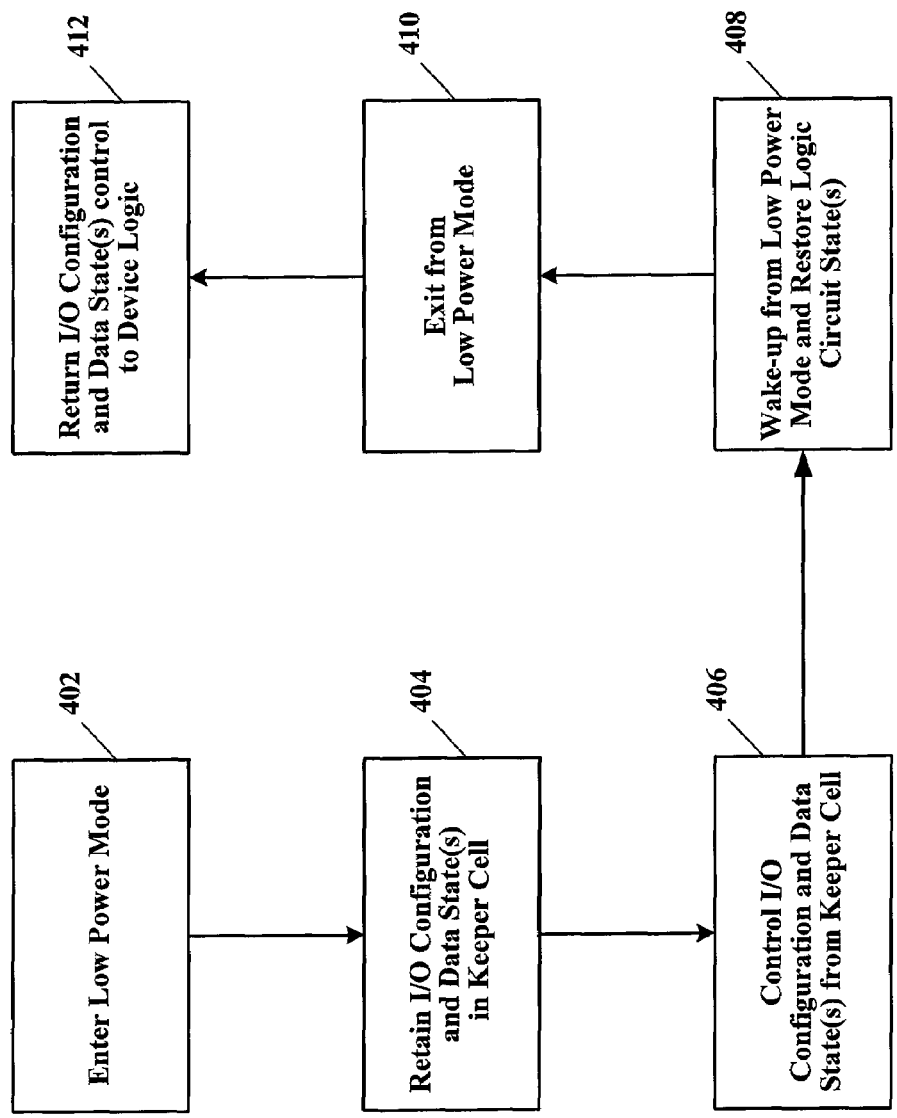
FIG. 4 illustrates a schematic operational flow diagram of an integrated circuit device entering into and returning from a low power mode, retention of data states and I/O configurations of an input-output (I/O) node of the integrated circuit device, according to a specific example embodiment of this disclosure.

Referring to FIG. 4, depicted is a schematic operational flow diagram of an integrated circuit device entering into and returning from a low power mode, retention of data states and I/O configurations of an input-output (I/O) node of the integrated circuit device, according to a specific example embodiment of this disclosure. In step 402, an integrated circuit device enters into a low power mode. In step 404, the input and/or output data state(s) and I/O configuration are retained in a keeper cell. In step 406, the I/O configuration and data state(s) are controlled by the retained information in the keeper cell irrespective of the logic states from the plurality of logic circuits of the integrated circuit device. In step 408, the plurality of logic circuits of the integrated circuit device wake-up from the low power mode and their logic circuit states are woken-up and restored after coming out of the low power mode. Once the logic circuit states of the plurality of logic circuits have been properly restored to a fully operational condition, an exit from low power mode will be asserted in step 410, and then in step 412 control of the I/O configuration and data state(s) will be returned back to the now fully operational plurality of logic circuits.

Figure 5:
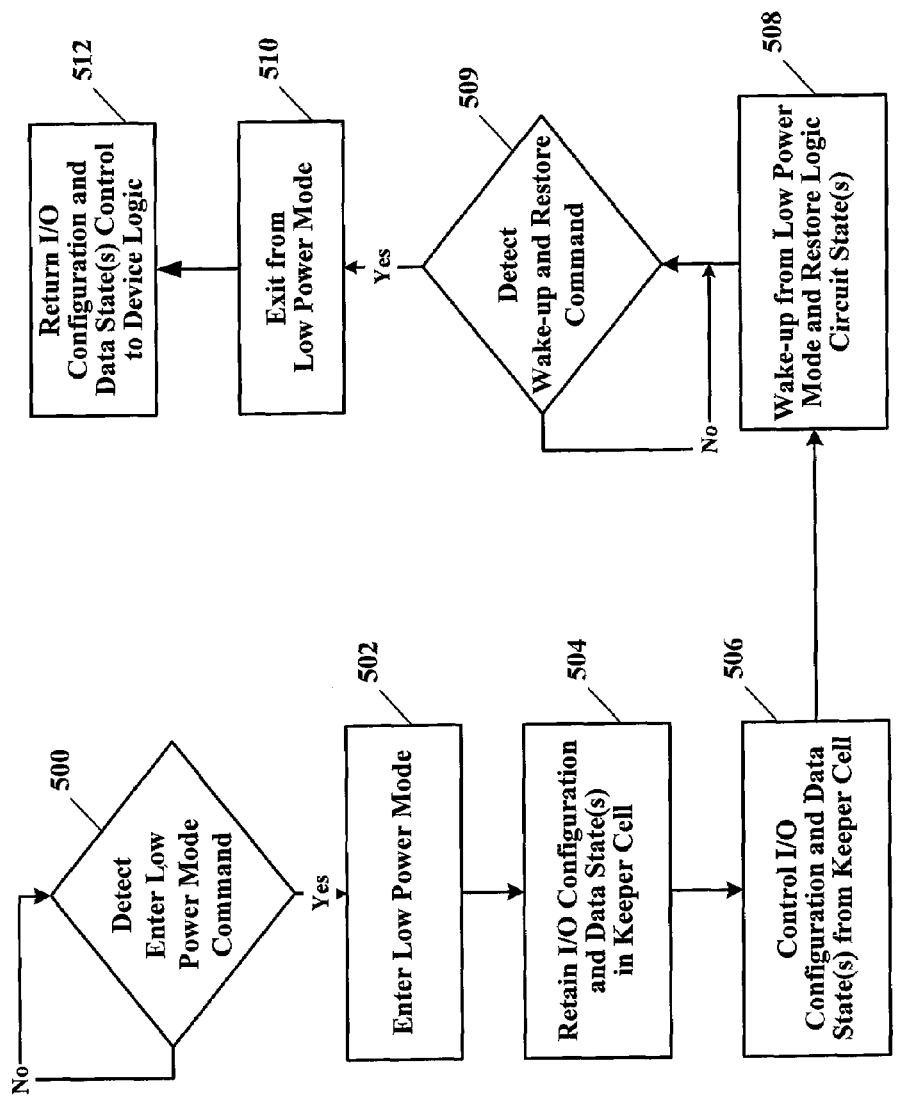
FIG. 5 illustrates a schematic operational flow diagram of an integrated circuit device entering into and returning from a low power mode under software control and retention of data states and I/O configurations of an input-output (I/O) node of the integrated circuit device, according to another specific example embodiment of this disclosure.

Referring to FIG. 5, depicted is a schematic operational flow diagram of an integrated circuit device entering into and returning from a low power mode under software control and retention of data states and I/O configurations of an input-output (I/O) node of the integrated circuit device, according to another specific example embodiment of this disclosure. Step 500 determines when an enter low power mode command is made from a software and/or firmware program. When the enter low power mode command is determined in step 500, an integrated circuit device will enter into a low power mode in step 502. In step 504, the input and/or output data state(s) and I/O configuration are retained in a keeper cell. In step 506, the I/O configuration and data state(s) are controlled by the retained information in the keeper cell irrespective of the logic states from the plurality of logic circuits of the integrated circuit device. In step 508, the plurality of logic circuits of the integrated circuit device wake-up from the low power mode and their logic circuit states are woken-up and restored after coming out of the low power mode. Step 509 determines when a wake-up and restore from low power mode command is made from a software and/or firmware program. When the wake-up and restore from low power mode command is determined in step 509, the integrated circuit device will exit from the low power mode in step 510. Then in step 512, control of the I/O configuration and data state(s) will be returned back to the now fully operational plurality of logic circuits.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. An integrated circuit device having a low power mode with a maintained configuration of an input receiver, and a maintained configuration and output data state of an output driver, comprising:

a plurality of logic circuits having a low power mode;
an input-output (I/O) node coupled to the plurality of logic circuits, the I/O node comprises an I/O keeper cell coupled to an output driver and an input receiver, wherein the output driver and the input receiver are configurable;
wherein when the I/O keeper cell receives an enter low power mode signal the I/O keeper cell maintains the input receiver according to a receive configuration and the output driver according to an output configuration and at an output data state that were determined by the plurality of logic circuits before entering the low power mode;

wherein when the I/O keeper cell receives a wake-up and restore from low power mode signal the I/O keeper cell returns control of the receive configuration of the input receiver and the output configuration and the output data state of the output driver to the plurality of logic circuits; and a low power mode register that stores logic levels for and controls the enter low power mode signal and the wake-up and restore from low power mode signal.

2. The integrated circuit device according to claim 1, wherein the enter low power mode signal and the wake-up and restore from low power mode signal are one signal having a first logic level and a second logic level, respectively, whereby when the one signal is at the first logic level the enter low power mode signal is asserted and when the one signal is at the second logic level the wake-up and restore from low power mode signal is asserted.

3. The integrated circuit device according to claim 2, wherein the first logic level is a logic "1" and the second logic level is a logic "0."

4. The integrated circuit device according to claim 2, wherein the first logic level is a logic "0" and the second logic level is a logic "1."

5. The integrated circuit device according to claim 1, wherein the driver and the receiver are coupled to an external I/O connection of an integrated circuit package.

6. The integrated circuit device according to claim 1, wherein the integrated circuit device is selected from the group consisting of microprocessor, microcontroller, digital signal processor (DSP), programmable logic array (PLA), and application specific integrated circuit (ASIC).

7. The integrated circuit device according to claim 1, wherein the I/O node and low power mode register are powered from the same power source.

8. The integrated circuit device according to claim 1, wherein the I/O node and low power mode register are powered from one power source and the plurality of logic circuits are powered from another power source.

9. The integrated circuit device according to claim 8, wherein the another power source is turned off when in the low power mode.

10. An integrated circuit device having a low power mode with a maintained configuration and output data state of an output driver, comprising:
    a plurality of logic circuits having a low power mode;
    an output node coupled to the plurality of logic circuits, the output node comprises an output keeper cell coupled to an output driver, wherein the output driver is configurable;
    wherein when the output keeper cell receives an enter low power mode signal the output keeper cell maintains the output driver at a configuration and an output data state that were determined by the plurality of logic circuits before entering the low power mode;
    wherein when the output keeper cell receives a wake-up and restore from low power mode signal the output keeper cell returns control of the configuration and the output data state of the driver to the plurality of logic circuits; and
    a low power mode register that stores logic levels for and controls the enter low power mode signal and the wake-up and restore from low power mode signal.

11. The integrated circuit device according to claim 10, wherein the enter low power mode signal and the wake-up and restore from low power mode signal are one signal having a first logic level and a second logic level, respectively, whereby when the one signal is at the first logic level the enter low power mode signal is asserted and when the one signal is at the second logic level the wake-up and restore from low power mode signal is asserted.

12. The integrated circuit device according to claim 11, wherein the first logic level is a logic "1" and the second logic level is a logic "0."

13. The integrated circuit device according to claim 11, wherein the first logic level is a logic "0" and the second logic level is a logic "1."

14. The integrated circuit device according to claim 10, wherein the driver is coupled to an external output connection of an integrated circuit package.

15. The integrated circuit device according to claim 10, wherein the integrated circuit device is selected from the group consisting of microprocessor, microcontroller, digital signal processor (DSP), programmable logic array (PLA), and application specific integrated circuit (ASIC).

16. The integrated circuit device according to claim 10, wherein the output node and low power mode register are powered from the same power source.

17. The integrated circuit device according to claim 10, wherein the output node and low power mode register are powered from one power source and the plurality of logic circuits are powered from another power source.

18. The integrated circuit device according to claim 17, wherein the another power source is turned off when in the low power mode.

19. An integrated circuit device having a low power mode and with a maintained configuration of an input receiver, comprising:
    a plurality of logic circuits having a low power mode;
    an input node coupled to the plurality of logic circuits, the input node comprises an input keeper cell coupled to an input receiver, wherein the input receiver is configurable;
    wherein when the input keeper cell receives an enter low power mode signal the input keeper cell maintains the input receiver at a configuration that was determined by the plurality of logic circuits before entering the low power mode;
    wherein when the input keeper cell receives a wake-up and restore from low power mode signal the input keeper cell returns control of the configuration of the input receiver to the plurality of logic circuits; and
    a low power mode register that stores logic levels for and controls the enter low power mode signal and the wake-up and restore from low power mode signal.

20. The integrated circuit device according to claim 19, wherein the enter low power mode signal and the wake-up and restore from low power mode signal are one signal having a first logic level and a second logic level, respectively, whereby when the one signal is at the first logic level the enter low power mode signal is asserted and when the one signal is at the second logic level the wake-up and restore from low power mode signal is asserted.

21. The integrated circuit device according to claim 20, wherein the first logic level is a logic "1" and the second logic level is a logic "0."

22. The integrated circuit device according to claim 20, wherein the first logic level is a logic "0" and the second logic level is a logic "1."

23. The integrated circuit device according to claim 19, wherein the receiver is coupled to an external input connection of an integrated circuit package.

24. The integrated circuit device according to claim 19, wherein the integrated circuit device is selected from the group consisting of microprocessor, microcontroller, digital signal processor (DSP), programmable logic array (PLA), and application specific integrated circuit (ASIC).

25. The integrated circuit device according to claim 19, wherein the input node and low power mode register are powered from the same power source.

26. The integrated circuit device according to claim 19, wherein the input node and low power mode register are powered from one power source and the plurality of logic circuits are powered from another power source.

27. The integrated circuit device according to claim 26, wherein the another power source is turned off when in the low power mode.

\* \* \* \* \*